(12) United States Patent
Chen et al.

(10) Patent No.: US 10,163,037 B2
(45) Date of Patent: Dec. 25, 2018

(54) TRAINING METHOD AND APPARATUS FOR NEURAL NETWORK FOR IMAGE RECOGNITION

(71) Applicant: FUJITSU LIMITED, Kawasaki-shi, Kanagawa (CN)

(72) Inventors: Li Chen, Beijing (CN); Song Wang, Beijing (CN); Wei Fan, Beijing (CN); Jun Sun, Beijing (CN); Naoi Satoshi, Kawasaki (CN)

(73) Assignee: FUJITSU LIMITED, Kawasaki-shi (JP)

( * ) Notice: Subject to any disclaimer, the term of this patent is extended or adjusted under 35 U.S.C. 154(b) by 12 days.

(21) Appl. No.: 15/254,249

(22) Filed: Sep. 1, 2016

(65) Prior Publication Data
US 2017/0061246 A1    Mar. 2, 2017

(30) Foreign Application Priority Data
Sep. 2, 2015    (CN) .......................... 2015 1 0556368

(51) Int. Cl.
| | |
|---|---|
| G06K 9/62 | (2006.01) |
| G06T 5/20 | (2006.01) |
| G06N 3/08 | (2006.01) |

(52) U.S. Cl.
CPC ......... *G06K 9/6232* (2013.01); *G06K 9/6255* (2013.01); *G06K 9/6256* (2013.01); *G06N 3/08* (2013.01); *G06T 5/20* (2013.01); *G06T 2207/10004* (2013.01); *G06T 2207/20084* (2013.01)

(58) Field of Classification Search
USPC ......................................................... 382/156
See application file for complete search history.

(56) References Cited

U.S. PATENT DOCUMENTS

| | | | |
|---|---|---|---|
| 5,903,884 A | 5/1999 | Lyon et al. | |
| 2003/0171899 A1* | 9/2003 | Castellane ............. | G01N 21/94 702/189 |
| 2004/0015464 A1 | 1/2004 | Ii et al. | |

(Continued)

OTHER PUBLICATIONS

Extended European Search Report dated Jan. 11, 2017 in corresponding European Patent Application No. 16179423.5.

*Primary Examiner* — Jerome Grant, II
(74) *Attorney, Agent, or Firm* — Staas & Halsey LLP

(57) ABSTRACT

A training method and a training apparatus for a neutral network for image recognition are provided. The method includes: representing a sample image as a point set in a high-dimensional space, a size of the high-dimensional space being a size of space domain of the sample image multiplied by a size of intensity domain of the sample image; generating a first random perturbation matrix having a same size as the high-dimensional space; smoothing the first random perturbation matrix; perturbing the point set in the high-dimensional space using the smoothed first random perturbation matrix to obtain a perturbed point set; and training the neutral network using the perturbed point set as a new sample. With the training method and the training apparatus, classification performance of a conventional convolutional neural network is improved, thereby generating more training samples, reducing influence of overfitting, and enhancing generalization performance of the convolutional neural network.

20 Claims, 9 Drawing Sheets

(56) References Cited

U.S. PATENT DOCUMENTS

| | | | |
|---|---|---|---|
| 2007/0276270 A1* | 11/2007 | Tran | A61B 5/0022 600/508 |
| 2012/0093204 A1* | 4/2012 | Al-Dhahir | H04B 3/32 375/222 |
| 2014/0177947 A1 | 6/2014 | Krizhevsky et al. | |
| 2014/0188487 A1* | 7/2014 | Perez Gonzalez | G10L 25/18 704/500 |
| 2015/0016622 A1* | 1/2015 | Togami | H04R 3/02 381/66 |
| 2015/0339570 A1* | 11/2015 | Scheffler | G06N 3/04 706/16 |
| 2015/0369756 A1* | 12/2015 | Rezgui | G01N 22/00 702/57 |
| 2016/0078359 A1* | 3/2016 | Csurka | G06N 7/005 706/12 |
| 2016/0287166 A1* | 10/2016 | Tran | H04B 1/3827 |
| 2016/0314800 A1* | 10/2016 | Stein | G10L 21/0208 |
| 2017/0053398 A1* | 2/2017 | Mahoor | G06T 7/0012 |
| 2017/0079530 A1* | 3/2017 | DiMaio | A61B 5/0075 |

\* cited by examiner

TRAINING METHOD AND APPARATUS FOR NEURAL NETWORK FOR IMAGE RECOGNITION

CROSS-REFERENCE TO RELATED APPLICATIONS

This application claims the priority benefit of Chinese Patent Application No. 201510556368.0, filed on Sep. 2, 2015 in the Chinese State Intellectual Property Office, the disclosure of which is incorporated herein in its entirety by reference.

BACKGROUND

1. Field

The present disclosure relates to the field of character recognition, and in particular to a training method and a training apparatus for a neural network for image recognition.

2. Description of the Related Art

Presently, in the field of handwritten character recognition, a method based on convolutional neural network (CNN) performs better as compared with a conventional recognition method. For a conventional neural network, a structure of which is shown in FIG. 1, a recognition process is as follow. By taking a handwritten numeric character 6 as an example, an image (sample) is input, and after multiple repetitions of convolution, maximum spatial sampling and full connection operations, CNN outputs a confidence coefficient on each numeric character, with the one with the highest confidence coefficient being the recognition result. In a conventional CNN model, each operation is denoted by one layer. For example, the convolution operation corresponds to a convolution layer, the maximum spatial sampling operation corresponds to a pooling layer, and the full connection operation corresponds to a full connection layer. The convolution layer and the pooling layer each output several two-dimension matrixes, referred to as a feature map. In FIG. 1, each block represents one feature map.

In recent years, it is indicated by many disclosed experimental evidences that, the more the number of the layers of the CNN is and the more the number of the neurons in each layer is, the better the performance of the CNN is. However, the bigger the model of the CNN is, the more difficult the training is. Major problems are as follows.

a) The bigger the model is and the more the parameters are, the more the samples required for training are.

b) The bigger the model is, the more it tends to over fit.

For the above two problems, in a case of a given training set, a conventional solution is as follow:

a) samples in the training set are randomly perturbed to generate more training samples; and b) the model is randomly perturbed during the training to enhance the generalization performance of the model, which method is referred to as a regularization method.

It is desirable to provide a more effective method and apparatus for solving the above two problems collectively in one framework.

SUMMARY

Additional aspects and/or advantages will be set forth in part in the description which follows and, in part, will be apparent from the description, or may be learned by practice of the invention.

A brief summary of the disclosure will be set forth hereinafter, so as to provide basic understanding of some aspects of the disclosure. It is to be understood that, this summary is not an exhaustive summary of the disclosure. It is neither intended to determine the critical or important part of the disclosure, nor intended to define the scope of the disclosure. It aims only to give some concepts in a simplified form, for serving as a preamble portion of the detailed description discussed latter.

In an aspect of the disclosure, it is provided a training method for a neural network for image recognition. The training method includes: representing a sample image as a point set in a high-dimensional space, a size of the high-dimensional space being a size of space domain of the sample image multiplied by a size of intensity domain of the sample image; generating a first random perturbation matrix having a same size as the high-dimensional space; smoothing the first random perturbation matrix; perturbing the point set in the high-dimensional space using the smoothed first random perturbation matrix to obtain a perturbed point set; and training the neural network using the perturbed point set as a new sample.

In an aspect of the disclosure, it is provided a training method for a neural network for image recognition. The training method includes: transforming a sample image to obtain a transform domain representation of the sample image; representing the transformed sample image as a point set in a high-dimensional space; generating a random perturbation matrix having a same size as the high-dimensional space; smoothing the random perturbation matrix; perturbing the point set in the high-dimensional space using the smoothed random perturbation matrix to obtain a perturbed point set; projecting the perturbed point set into a transform domain sub-space of the high-dimensional space to obtain a transform domain representation of a perturbed sample image; inversely transforming the transform domain representation of the perturbed sample image to obtain a perturbed image; and training the neural network using the perturbed image as a new sample.

In an aspect of the disclosure, it is provided a training apparatus for a neural network for image recognition. The training apparatus includes: a high-dimensional space representing unit configured to represent a sample image as a point set in a high-dimensional space, a size of the high-dimensional space being a size of space domain of the sample image multiplied by a size of intensity domain of the sample image; a first random perturbation matrix generating unit configured to generate a first random perturbation matrix having a same size as the high-dimensional space; a first smoothing unit configured to smooth the first random perturbation matrix; a first perturbing unit configured to perturb the point set in the high-dimensional space using the smoothed first random perturbation matrix to obtain a perturbed point set; and a training sample determining unit configured to train the neural network using the perturbed point set as a new sample.

Further, it is provided a computer program for implementing the above method in an embodiment of the disclosure.

Further, it is provided a computer program product at least in a form of a computer readable medium, on which a computer program code for implementing the above method is recorded.

These and other advantages of the disclosure will be more apparent through the detailed description of the preferred embodiments of the disclosure given conjunction with the drawings.

BRIEF DESCRIPTION OF THE DRAWINGS

The above and other objects, features and benefits of the disclosure will be understood more easily with reference to the description of the embodiments of the disclosure given in conjunction with the drawings. The components in the drawings are only for showing the principle of the disclosure. In the drawings, identical or similar technical features or components are represented by identical or similar numeral references.

DETAILED DESCRIPTION

Figure 1:
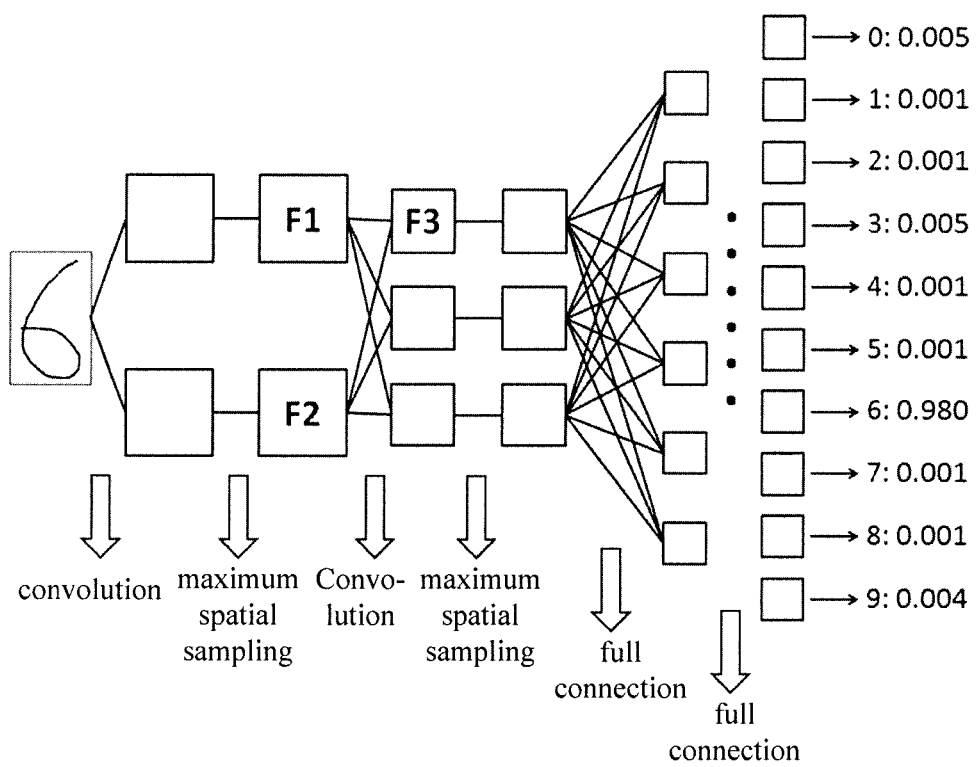
FIG. 1 shows a structure of a conventional neural network.

Reference will now be made in detail to the embodiments, examples of which are illustrated in the accompanying drawings, wherein like reference numerals refer to the like elements throughout. The embodiments are described below by referring to the figures.

Hereinafter, demonstrative embodiments of the disclosure will be described in conjunction with the drawings. For clearness and conciseness, not all the features of the practical embodiments are described in the specification. However, it is to be understood that, in development of any one of the practical embodiments, many decisions specific to the embodiment must be made, so as to achieve the specific object of the developer, such as in accordance with these limitations related to system and service, with these limitations varying with different embodiments. Moreover, it is to be understood that, although the developing work may be very complex and time-wasting, it is only a routine task for those skilled in the art benefit from the disclosure.

Here, it is to be noted that, in the drawings, only device structures and/or process steps closely related to the solution of the disclosure are shown, and other details less related to the disclosure are omitted, in order not to obscure the disclosure with unnecessary details.

It is provided a training method and a training apparatus for a neural network for image recognition in the disclosure, for providing more training samples for a convolutional neural network (CNN), and solving the problem of over fitting.

In the method according to the disclosure, the two problems mentioned above in the "BACKGROUND" are solved collectively in one framework. As compared with the conventional method, the disclosure has following advantages.

(1) A more generally applicable method for generating sample is adopted, so that the generated samples have wider coverage.

(2) A new regularization method is adopted, which is better for solving the problem of over fitting as compared with the conventional method.

Hereinafter, a training method and apparatus for a neural network for image recognition will be described in detail in conjunction with the drawings. The descriptions are given in a following order:

1. a training method for a neural network for image recognition
2. a training apparatus for a neural network for image recognition
3. a computing device in which the training method and apparatus for the neural network for image recognition according to the disclosure can be embodied

[1. A Training Method for a Neural Network for Image Recognition]

In the method according to the disclosure, by randomly deforming the samples in the training set, i.e., by randomly perturbing the samples in the training set, the training set is extended.

The object to be randomly deformed is a two-dimensional image having a size of W*H, where W is a width of the image, and H is a height of the image (an input to the CNN model as shown in FIG. 1). Different types of images may have different number of channels (the number of the channels may be referred to as a dimension of intensity domain). For example, the number of the channels of a gray image is 1, and the number of the channels of a color image is 3. A size of intensity domain of an image may be represented as D1*D2* . . . *Dn where n is the number of the channels, and D1, D2, . . . , Dn are value ranges of intensities of respective channels. For the gray image, the size of the intensity domain is 255, and for the color image, the size of the intensity domain is 255*255*255. Here, the sample image is considered as a point set in a two-dimensional space, and a pixel value at a point (w, h) is ($d_1$, $d_2$, . . . , $d_n$). In the method according to the disclosure, each pixel of the sample image is represented as a point in a high-dimensional space W*H*D1*D2* . . . *Dn, and a point corresponding to a point (w, h) is (w, h, $d_1$, $d_2$, . . . , $d_n$). In order to randomly perturb the original image, a small perturbation is added to each point in the point set as follow:

$$(w',h',d_1',d_2', \ldots ,d_n')=(w,h,d_1,d_2, \ldots d_n)+ (\Delta w, \Delta h, \Delta d_1, \Delta d_2, \ldots \Delta d_n) \quad (1)$$

where ($\Delta w$, $\Delta h$, $\Delta d_1$, $\Delta d_2$, . . . $\Delta d_n$) is a small random perturbation of the point (w, h, $d_1$, $d_2$, . . . , $d_n$).

Figure 2:
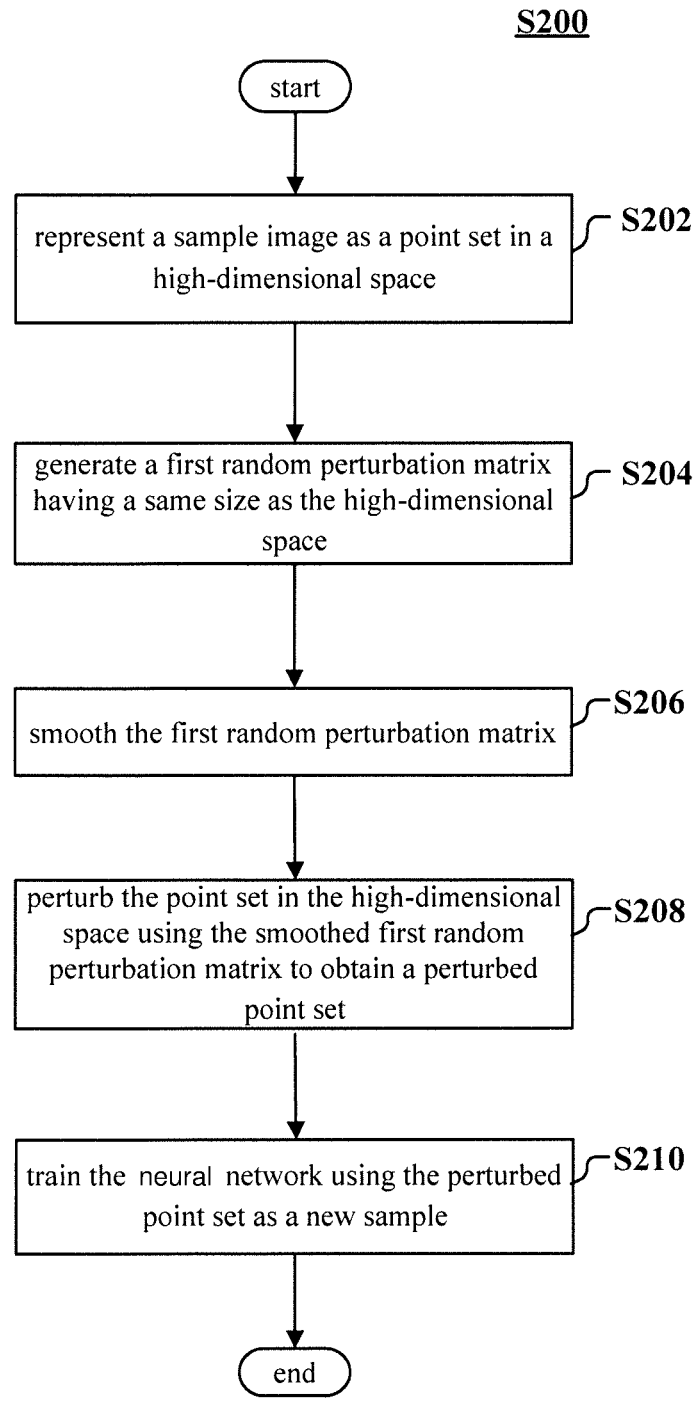
FIG. 2 shows a flowchart of an exemplary process of a training method 200 for a neural network for image recognition according to an embodiment of the disclosure.

Based on the above idea, a flowchart of an exemplary process of a training method 200 for a neural network for image recognition according to an embodiment of the disclosure is shown in FIG. 2.

First, in step S202, a sample image I is represented as a point set P in a high-dimensional space. A size of the high-dimensional space is equal to a size of space domain of the sample image multiplied by a size of intensity domain of the sample image, i.e., W*H*D1*D2* ... *Dn.

Next, in step S204, a random perturbation matrix M is generated, which has a same size as the high-dimensional space. That is, a size of M is also W*H*D1*D2* ... *Dn.

In an example, the random perturbation matrix M is generated through a given probability distribution. The given probability distribution may be a Gaussian distribution, a uniform distribution or other continuous distributions.

In step S206, the random perturbation matrix M is smoothed.

Specifically, the random perturbation matrix M is filtered using an n+2 dimensional (which is the same as the dimensional of the random perturbation matrix M) low-pass filter to generated a matrix M'. The low-pass filter may be a Gaussian filter, a mean filter, a middle value filter or the like.

In step S208, the point set P is perturbed using the smoothed random perturbation matrix M' to obtain a perturbed point set P'.

In an example, the point set P may be disturbed using the above formula (1).

Finally, in step S210, the neural network may be trained using the perturbed point set as a new sample.

In an example, specifically, step S210 includes projecting the perturbed point set P' into a two-dimensional or three-dimensional sub-space of the high-dimensional space to obtain a projected image I', and training the neural network using the projected image I' as a new sample.

In another embodiment according to the disclosure, the above random deformation method is applied to feature maps outputted by a convolution layer in training the neural network, to obtain the regularization method proposed in the disclosure. A feature map may be mathematically represented as a two-dimensional matrix. Generally, the convolution layer outputs multiple feature maps having a same size. In the disclosure, these feature maps are represented as a three-dimensional matrix F, which has a size of W*H*N, where W and H represent a width and a height of each of the feature maps, and N represents the number of the feature maps. The basic idea of the regularization method according to the disclosure is as follow. Some random noise is added to the feature map outputted by the convolution layer in training, so that the CNN model is forced to learn useful knowledge from the data with noise, thereby enhancing the generalization performance of the CNN model.

Figure 3:
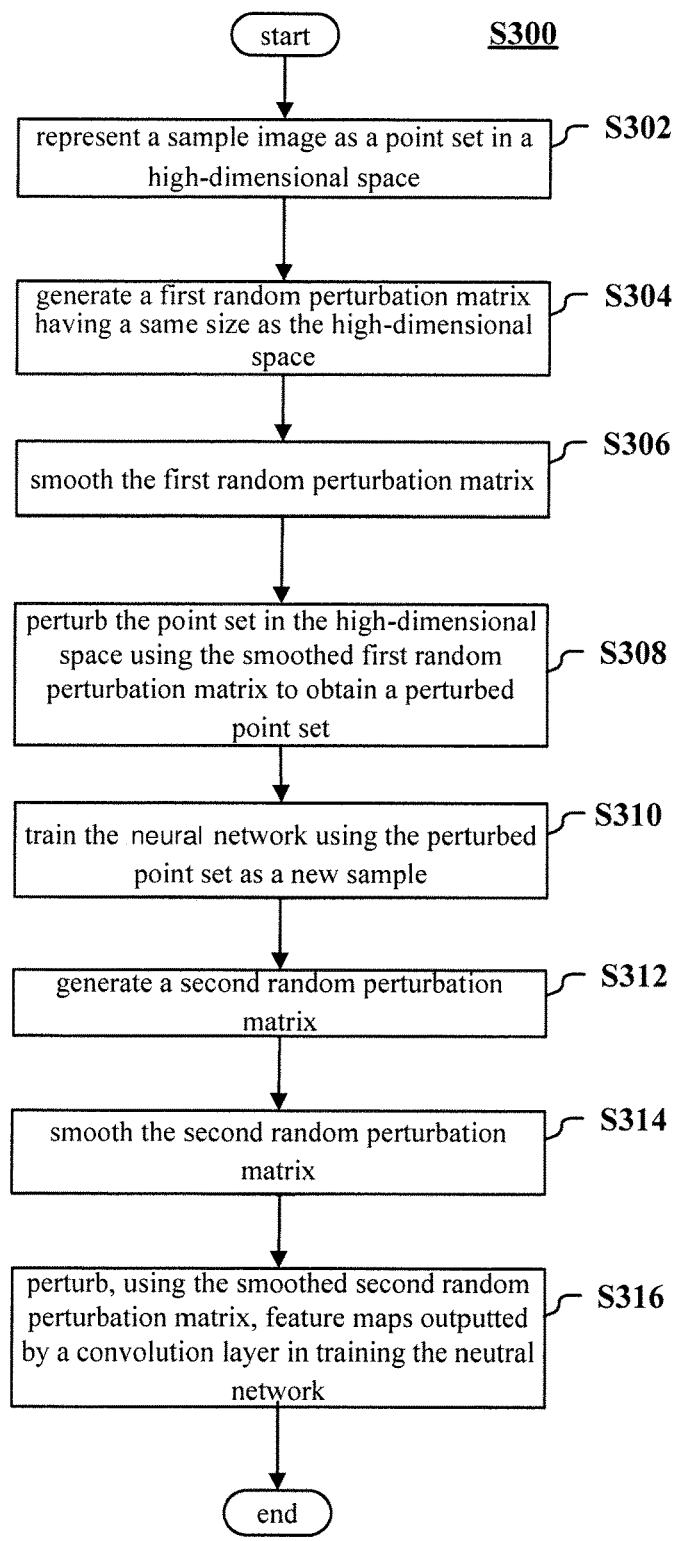
FIG. 3 shows a flowchart of an exemplary process of a training method 300 for a neural network for image recognition according to another embodiment of the disclosure.

A flowchart of an exemplary process of a training method 300 for a neural network for image recognition according to another embodiment of the disclosure is shown in FIG. 3.

Steps S302 to S310 of the training method 300 in FIG. 3 are respectively similar to steps S202 to S210 of the training method 200 in FIG. 2, and are not described again here.

The training method shown in FIG. 3 further includes following steps S312 to S316.

In step S312, a random perturbation matrix L is generated, which has a size of W*H*N.

In an example, the random perturbation matrix M is generated through a given probability distribution. The given probability distribution may be a Gaussian distribution, a uniform distribution or other continuous distributions.

In step S314, the random matrix L is filtered using a three-dimensional low-pass filter to generate a matrix L'.

The low-pass filter may be a Gaussian filter, a mean filter, a middle value filter or the like.

In step S316, the feature maps F are perturbed using the smoothed random matrix L' to obtain perturbed feature maps F'.

Generally, the feature map is perturbed by adding a corresponding weighted value of the random perturbation matrix to a value of the feature map. The larger the absolute value of the feature map is, the larger the weighting coefficient is.

In an example, the feature map F may be perturbed in accordance with the following formula:

$$F'(w,h,n)=F(w,h,n)+\eta \cdot |F(w,h,n)| \cdot R(w,h,n) \qquad (2)$$

In the training method 300 in FIG. 3, by steps S312 to S316, some random noise may be added to the feature map outputted by the convolution layer, so that the CNN model is forced to learn useful knowledge from the data with noise, thereby enhancing the generalization performance of the CNN model.

Figure 4:
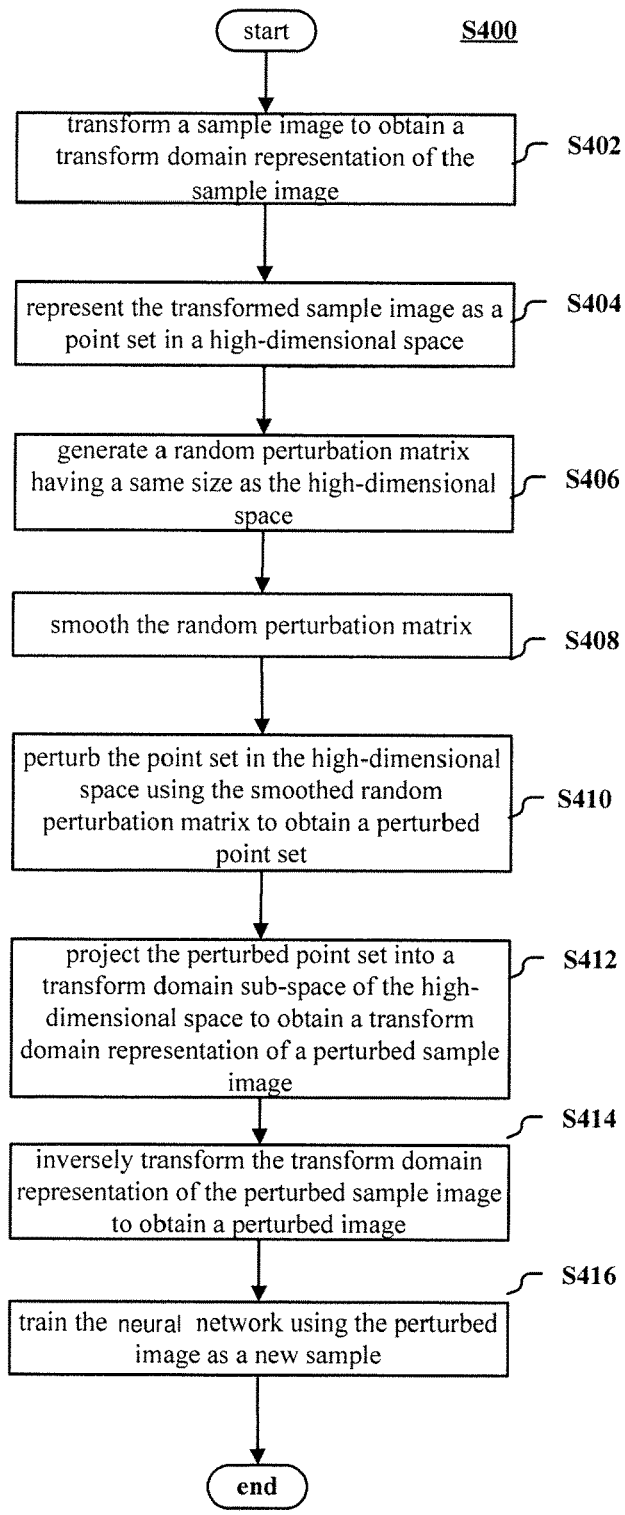
FIG. 4 shows a flowchart of an exemplary process of a training method 400 for a neural network for image recognition according to another embodiment of the disclosure.

In a training method for a neural network for image recognition according to another embodiment of the disclosure, the original image may be converted into frequency domain based on the above method, the image is perturbed in frequency domain using the same method, and finally the image is converted back into space domain from frequency domain. A flowchart of an exemplary process of a training method 400 for a neural network for image recognition according to another embodiment of the disclosure is shown in FIG. 4.

The training method 400 includes following steps S402 to S416. In step S402, a sample image is transformed to obtain a transform domain representation of the sample image. In step S404, the transformed sample image is represented as a point set in a high-dimensional space. In step S406, a random perturbation matrix is generated, which has a same size as the high-dimensional space. In step S408, the random perturbation matrix is smoothed. In step S410, the point set in the high-dimensional space is perturbed using the smoothed random perturbation matrix to obtain a perturbed point set. In step S412, the perturbed point set is projected into a transform domain sub-space of the high-dimensional space to obtain a transform domain representation of a perturbed sample image. In step S414, the transform domain representation of the perturbed sample image is inversely transformed to obtain a perturbed image. In step S416, the neural network is trained using the perturbed image as a new sample.

It can be seen that, steps S404, S406, S408 and S410 are respectively similar to steps S202, S204, S206 and S208 in the training method 200 in FIG. 2, and are not described again here.

Here, description will be made focusing on steps S402, S412 and S414.

First, step S402 (transformation of a sample image to obtain a transform domain representation of the sample image) is described in detail.

In this specification, description is given by taking transformation of the original image into frequency domain as an example. Transformation of the original image into a frequency domain representation may be implemented by Discrete Fourier Transformation (DFT) or Discrete Cosine Transformation (DCT). Here, the description is given by taking DFT as an example, and steps for DCT are identical to steps for DFT. Since DFT is generally applied to a two-dimensional image, for a single-channel image, a spectrogram may be obtained directly by DFT; and for a multi-channel image, DFT may be performed on each of the channels to obtain a spectrogram of the channel, and then respective spectrograms of the channels are combined. In order to represent the spectrogram as a point set in a discrete multi-dimensional space, the spectrograms of the channels may be normalized.

Figure 5:
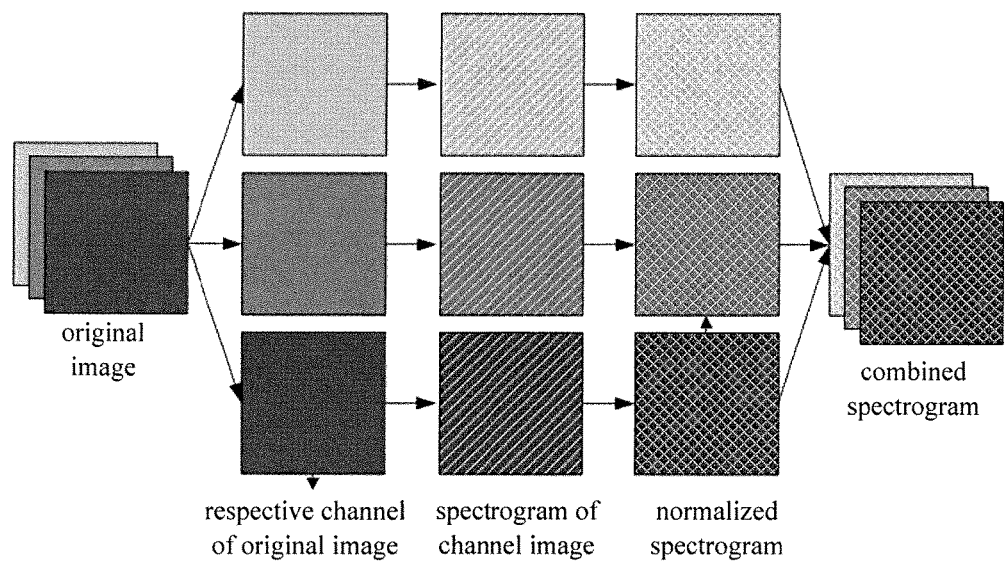
FIG. 5 shows a schematic diagram of a conversion of a three-channel image into a frequency domain presentation.

A conversion of a three-channel image into a frequency domain presentation is shown in FIG. 5. First, the original image is split into three single-channel images based on the channel. DFT is performed on each of the three single-channel images, to obtain respective spectrograms. The spectrogram of each channel is normalized. Finally, the normalized spectrograms are combined based on the channel to form a spectrogram corresponding to the original image. For convenient representation, the original image and its spectral image are staggered based on the channel.

The spectrogram of each channel is normalized as follows.
1) Logarithmic transformation is performed on a value d of each pixel point on the spectrogram:

$$d'=\log(1+d) \quad (3)$$

2) The value of each pixel point on the spectrogram after the transformation is linearly transformed into [0, MAX], and an integer nearest to the value is found, where MAX is a given positive integer.

After being obtained as shown in FIG. 5, the spectrogram may be considered as a point in a high-dimensional space. The specific method is the same as the random deformation method in FIG. 2.

Next, step S412 in which the perturbed point set is projected into a transform domain sub-space of the high-dimensional space to obtain a transform domain representation of a perturbed sample image, and step S414 in which the transform domain representation of the perturbed sample image is inversely transformed to obtain a perturbed image, are described in detail.

Processes in steps S412 and S414 are inverse processes in steps S402 and S404. In step S412, the perturbed point set is projected into the sub-space to obtain the transform domain representation of the perturbed sample image. In a case that the original image is transformed into frequency domain, this sub-space is frequency domain.

Step S414 is described hereinafter in conjunction with FIG. 6. A DFT inverse transform process of a three-channel image is shown in FIG. 6.
1) The deformed multi-channel spectrogram is split into single-channel spectrograms.
2) Inverse normalization is performed on each of the single-channel spectrograms to obtain an inverse normalized spectrogram.
3) Inverse DFT is performed on the inverse normalized spectrogram to obtain a single-channel space domain image.
4) All single-channel space domain images are combined based on the channel to obtain a randomly-perturbed image.

Figure 6:
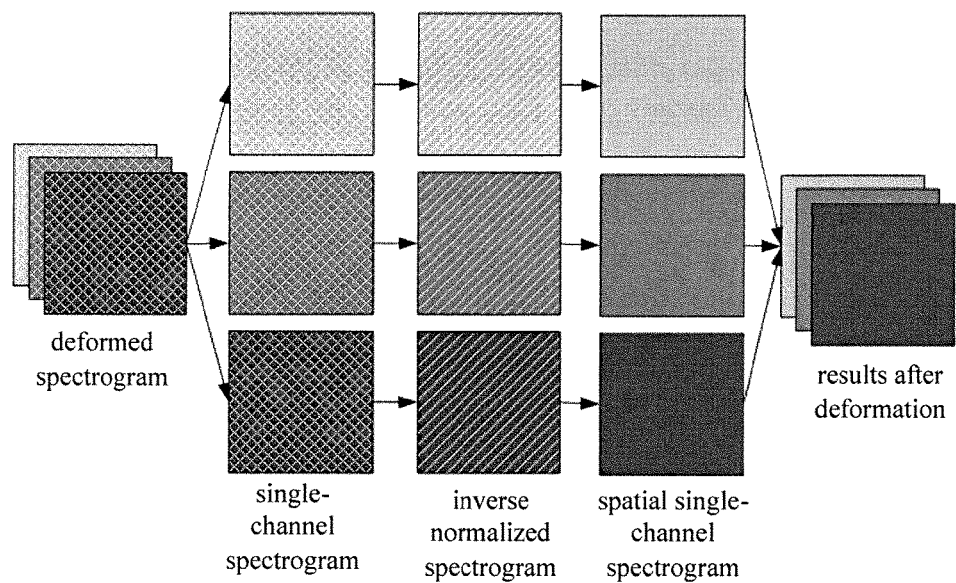
FIG. 6 shows a schematic diagram of a DFT inverse transform process of a three-channel image.

It is to be noted that, rectangles having the same textures in FIGS. 5 and 6 do not necessarily represent the images having the same characteristics, and the arrange of the texture in FIG. 6 is only meant to highlight that the process shown in FIG. 6 is an inverse process to that shown in FIG. 5.

The inverse normalization in FIG. 6 is an inverse process of the normalization described in conjunction with FIG. 5 above. And the inverse normalization is as follows.
1) Mapping is performed on the value of each point on the single-channel spectrogram in accordance with a function y=h(x). Assuming that the linear transformation function for the normalization operation is y=f(x), then $h(x)=f^{-1}(x)$.
2) The result of the mapping is transformed in accordance with a formula $d'=e^d-1$, to obtain a result of the inverse normalization.

Finally, in step S416, the neural network may be trained using the perturbed image set as a new sample.

It is to be understood by those skilled in the art that, in another embodiment according to the disclosure, after step S416, the training method 400 may further include a step of randomly perturbing the feature maps outputted by the convolution layer, similarly to the training method 300 shown in FIG. 3, which is not described again here.

It is to be noted that, the above random deformation method for randomly perturbing the sample in the training set and the above regularization method for adding random noise to the feature map are only adopted during the training of the neural network. For the model obtained using the above two methods during the training, the above methods are omitted during the testing of the neural network, that is, it is not necessary to scramble the feature map or add random noise to the feature map during the testing.

[2. A Training Apparatus for a Neural Network for Image Recognition]

Figure 7:
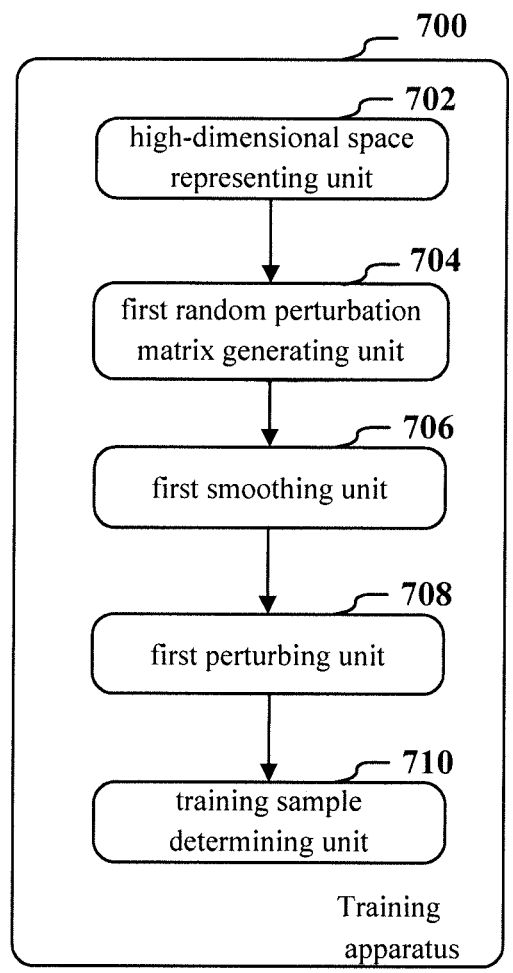
FIG. 7 is a block diagram showing an exemplary configuration of a training apparatus 700 for a neural network for image recognition according to an embodiment of the disclosure.

FIG. 7 is block diagram showing an exemplary configuration of a training apparatus 700 for a neural network for image recognition according to an embodiment of the disclosure.

As shown in FIG. 7, the training apparatus 700 for a neutral network for image recognition includes a high-dimensional space representing unit 702, a first random perturbation matrix generating unit 704, a first smoothing unit 706, a first perturbing unit 708 and a training sample determining unit 710.

The high-dimensional space representing unit 702 is configured to represent a sample image as a point set in a high-dimensional space, a size of the high-dimensional space being a size of space domain of the sample image multiplied by a size of intensity domain of the sample image.

The first random perturbation matrix generating unit 704 is configured to generate a first random perturbation matrix having a same size as the high-dimensional space.

The first smoothing unit 706 is configured to smooth the first random perturbation matrix.

The first perturbing unit 708 is configured to perturb the point set in the high-dimensional space using the smoothed first random perturbation matrix to obtain a perturbed point set.

The training sample determining unit 710 is configured to train the neutral network using the perturbed point set as a new sample.

The size of the space domain is a width of the sample image multiplied by a height of the sample image, and the size of the intensity domain is D1×D2× . . . ×Dn, where n is a dimension of the intensity domain, D1, D2, . . . , Dn are sizes of respective dimensions of the intensity domain.

The training sample determining unit 710 is further configured to project the perturbed point set into a two-dimensional or three-dimensional sub-space of the high-dimensional space to obtain a projected image, and train the neural network using the projected image as a new sample.

The first random perturbation matrix is generated through a given probability distribution. The given probability distribution is a Gaussian distribution or a uniform distribution.

The first smoothing unit 706 is further configured to smooth the first random perturbation matrix using a low-pass filter having a same dimension as the first random perturbation matrix. The low-pass filter is one of a Gaussian filter, a mean filter and a middle value filter.

The first perturbing unit 708 is further configured to add a value of a corresponding element in the smoothed first random perturbation matrix to a value of each point in the point set in the high-dimensional space.

Figure 8:
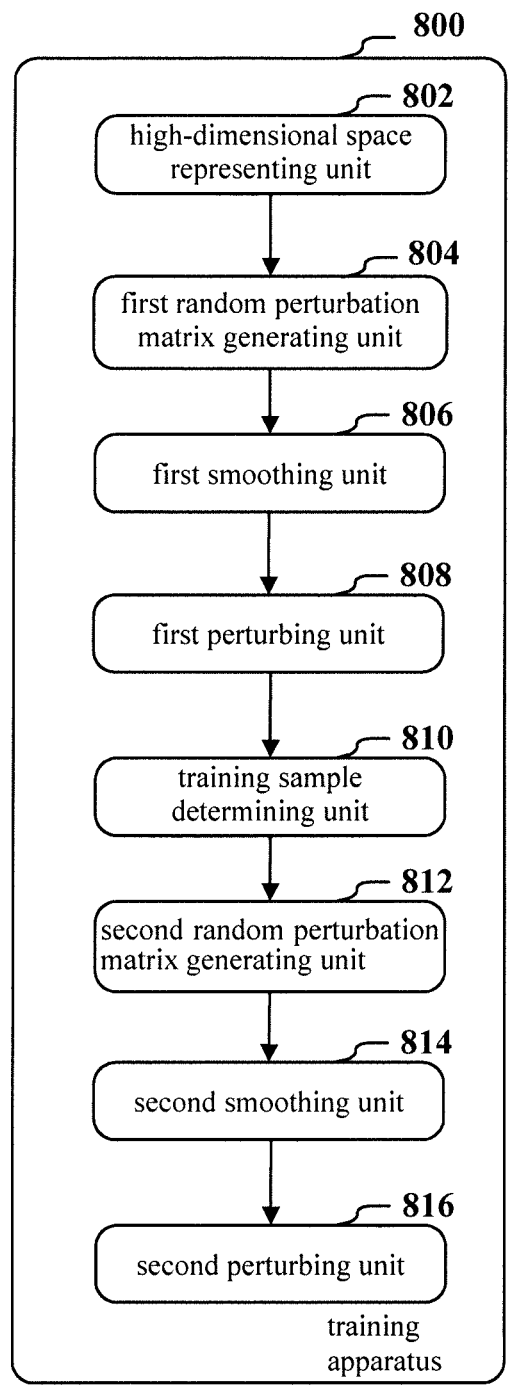
FIG. 8 is a block diagram showing an exemplary configuration of a training apparatus 800 for a neural network for image recognition according to another embodiment of the disclosure.

FIG. 8 is a block diagram showing an exemplary configuration of a training apparatus 800 for a neural network for image recognition according to another embodiment of the disclosure.

As shown in FIG. 8, the training apparatus 800 includes a high-dimensional space representing unit 802, a first random perturbation matrix generating unit 804, a first smoothing unit 806, a first perturbing unit 808, a training sample determining unit 810, a second random perturbation matrix generating unit 812, a second smoothing unit 814 and a second perturbing unit 816.

In other words, in addition to the respective components of the training apparatus 700 shown in FIG. 7, the training apparatus 800 shown in FIG. 8 further includes the second random perturbation matrix generating unit 812, the second smoothing unit 814 and the second perturbing unit 816.

The high-dimensional space representing unit 802, the first random perturbation matrix generating unit 804, the first smoothing unit 806, the first perturbing unit 808 and the training sample determining unit 810 in FIG. 8 are respectively similar to the high-dimensional space representing unit 702, the first random perturbation matrix generating unit 704, the first smoothing unit 706, the first perturbing unit 708 and the training sample determining unit 710 described in conjunction with FIG. 7, and are not described again here.

In the training apparatus 800 shown in FIG. 8, the second random perturbation matrix generating unit 812 is configured to generate a second random perturbation matrix.

A size of the second random perturbation matrix is a length of the feature map multiplied by a width of the feature map multiplied by a number of the feature maps, the feature map being outputted by the convolution layer during the training of the neural network.

In an example, the second random perturbation matrix is generated through a given probability distribution. The given probability distribution may be a Gaussian distribution, a uniform distribution or other continuous distributions.

The second smoothing unit 814 is configured to smooth the second random perturbation matrix.

Specifically, the second random perturbation matrix is filtered using a three-dimensional low-pass filter.

The low-pass filter may be a Gaussian filter, a mean filter, a middle value filter or the like.

The second perturbing unit 816 is configured to perturb, using the smoothed second random perturbation matrix, feature maps.

The second perturbing unit 816 is further configured to add a corresponding weighted value of the random perturbation matrix to a value of the feature map. The larger the absolute value of the feature map is, the larger the weighting coefficient is.

Figure 9:
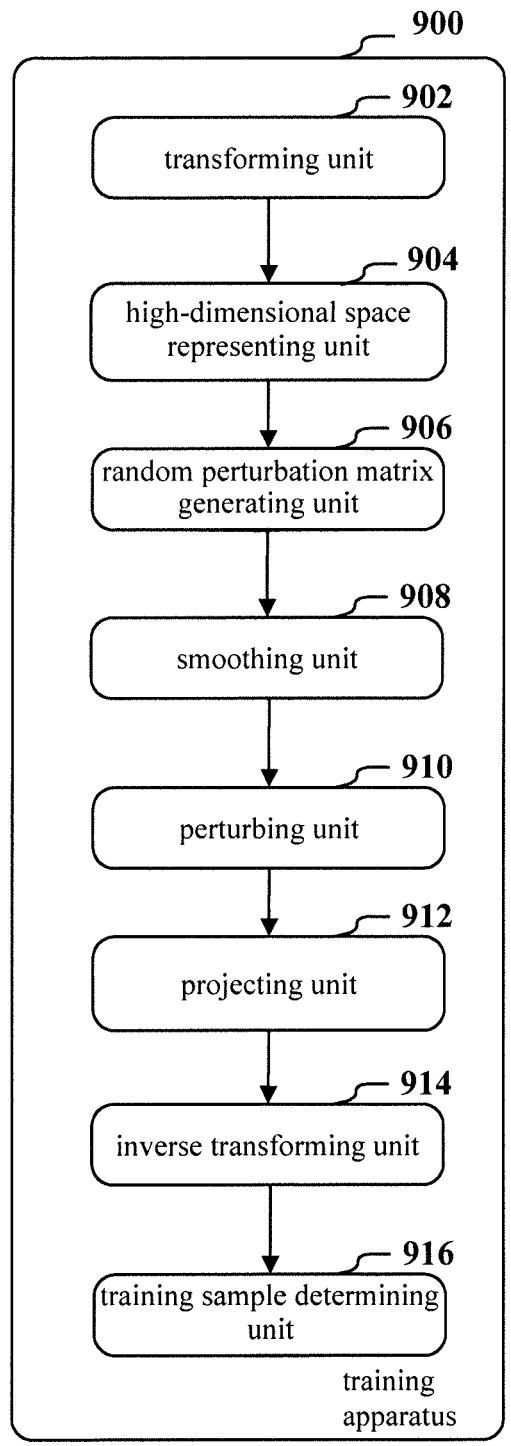
FIG. 9 is a block diagram showing an exemplary configuration of a training apparatus 900 for a neural network for image recognition according to another embodiment of the disclosure.

FIG. 9 is a block diagram showing an exemplary configuration of a training apparatus 900 for a neural network for image recognition according to another embodiment of the disclosure As shown in FIG. 9, the training apparatus 900 includes a transforming unit 902, a high-dimensional space representing unit 904, a random perturbation matrix generating unit 906, a smoothing unit 908, a perturbing unit 910, a projecting unit 912, an inverse transforming unit 914 and a training sample determining unit 916.

The transforming unit 902 is configured to transform a sample image to obtain a transform domain representation of the sample image. The high-dimensional space representing unit 904 is configured to represent the transformed sample image as a point set in a high-dimensional space. The random perturbation matrix generating unit 906 is configured to generate a random perturbation matrix having a same size as the high-dimensional space. The smoothing unit 908 is configured to smooth the random perturbation matrix. The perturbing unit 910 is configured to perturb the point set in the high-dimensional space using the smoothed random perturbation matrix to obtain a perturbed point set. The projecting unit 912 is configured to project the perturbed point set into a transform domain sub-space of the high-dimensional space to obtain a transform domain representation of a perturbed sample image. The inverse transforming unit 914 is configured to inversely transform the transform domain representation of the perturbed sample image to obtain a perturbed image. The training sample determining unit 916 is configured to train the neural network using the perturbed image as a new sample.

For details of operations and functions of various components of the training apparatus 700, 800 and 900 for the neural network for image recognition, reference may be made to the embodiments of the training method the neural network for image recognition according to the disclosure described in conjunction with FIGS. 1 to 6, which will not be descried again here.

It is to be noted here that, the structures of the apparatus and integral unit thereof shown in FIGS. 7 to 9 are only illustrative, and modifications may be made to the structural diagrams shown in FIGS. 7 to 9 by those skilled in the art as required.

A training method and a training apparatus for a neural network for image recognition are proposed in the disclosure. In the disclosure, the classification performance of the conventional convolutional neural network (CNN) is improved in two aspects. Firstly, for the problem of insufficient CNN training samples, the disclosure extends the conventional random deformation method, so that this method covers wider range, thereby generating more training samples. Secondly, for the problem of over fitting of the CNN model, the disclosure proposes a new regularization method. This method slightly perturbs the feature maps outputted by the convolution layer in training the neural network, so that the CNN model is trained more robustly, thereby reducing the influence of the over fitting and enhancing the generalization performance of the CNN model.

[3. A Computing Device in which the Training Method and Apparatus for the Neural Network for Image Recognition According to the Disclosure can be Embodied]

The basic principle of the disclosure has been described above in conjunction with specific embodiments. However, it is to be noted that, it is to be understood by those skilled in the art that, all or any step or component of the method and apparatus of the disclosure may be implemented in hardware, firmware, software or a combination thereof in any computing apparatus (including a processor, a storage medium and the like) or a network of computing apparatus, which is implementable by those skilled in the art using their basic programming skill upon reading the description of the disclosure.

Thus, the objects of the disclosure may be implemented by a program or a group of programs running on any computing apparatus. The computing apparatus may be a well-known common apparatus. Thus, the objects of the disclosure may also be implemented by providing a program product containing program code for implementing the method or apparatus. That is to say, such program product is also a part of the disclosure, and so does the storage medium in which such program product is stored. Apparently, the storage medium may be any well-known storage medium or any storage medium that will be developed in the future.

Figure 10:
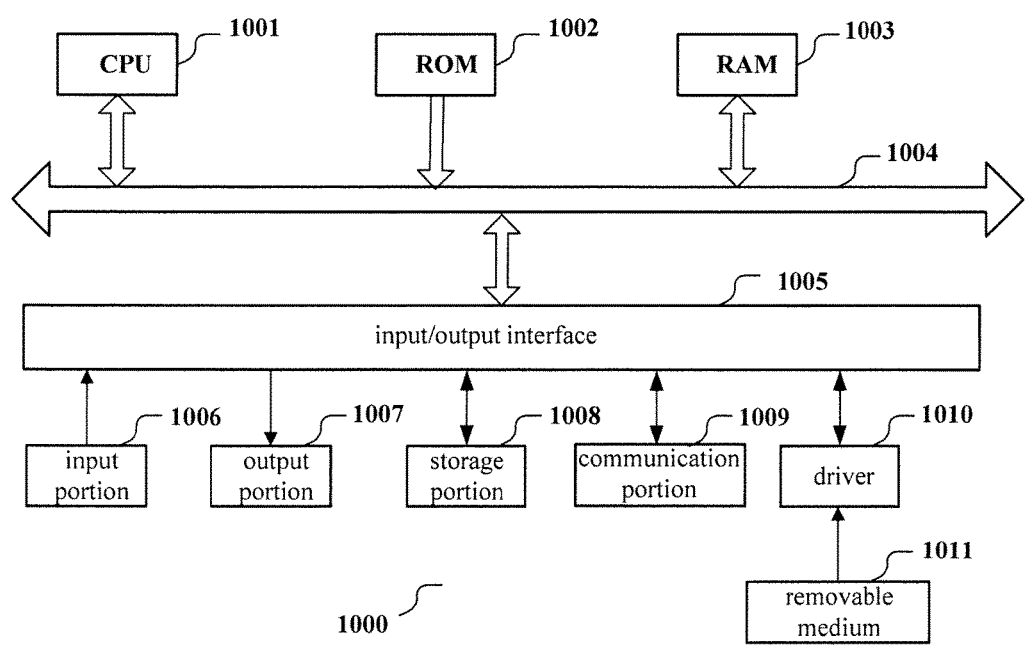
FIG. 10 is an exemplary structural diagram showing a computing device in which the training method and apparatus for the neural network for image recognition according to the disclosure can be embodied.

In a case that the embodiment of the disclosure is implemented in software and/or firmware, programs composing this software are mounted onto a computer having a dedicated hardware structure, such as the general purpose computer 1000 as shown in FIG. 10, from a storage medium or a network. The computer, when being mounted with various programs, is capable of performing various functions and the like.

In FIG. 10, a central processing unit (CPU) 1001 performs various processes based on a program stored in a read-only memory (ROM) 1002 or a program loaded onto a random access memory (RAM) 1003 from a storage portion 1008. In the RAM 1003, data required by the CPU 1001 in performing various processes and the like are stored as required. The CPU 1001, the ROM 1002 and the RAM 1003 are linked to each other via a bus 1004. An input/output interface 1005 is also linked to the bus 1004.

Linked to the input/output interface 1005 are: an input portion 1006 (including the keyboard, the mouse and the like), an output portion 1007 (including a display, such as a cathode ray tube (CRT) and a liquid crystal display (LCD), a speaker and the like), the storage portion 1008 (including a hard disk and the like) and a communication portion 1009 (including a network interface card, such as an LAN card and a modem). The communication portion 1009 performs communication processes via a network, such as Internet. A driver 1010 may also be linked to the input/output interface 1005 as required. A removable medium 1011, such as a magnetic disk, an optical disk, a magneto-optical disk and a semiconductor memory, may be mounted on the driver 1010 as required, so that the computer program that is read out from the removable medium 1011 is mounted onto the storage portion 1008.

In a case that the above series of processes are implemented in software, programs composing this software are mounted from a network, such as Internet, or from a storage medium, such as the removable medium 1011.

It is to be understood by those skilled in the art that, the storage medium is not limited to the removable medium 1011 shown in FIG. 10 in which the program is stored and which is distributed separately from the device to provide the user with the program. Examples of the removable medium 1011 include a magnetic disk (including a soft disk (registered trademark)), an optical disk (including a compact disk read only memory (CD-ROM) and a digital video disk (DVD)), a magneto-optical disk (including a mini disk (MD) (registered trademark)) and a semiconductor memory. Alternatively, the storage medium may be a hard disk contained in the ROM 1002 or the storage portion 1008 and the like, in which a program is stored and which is distributed to the user together with the device containing the same.

It is further proposed a program product having machine readable instruction codes stored therein in the disclosure. The instruction codes, when being read out and executed by the machine, performs the above method according to the embodiment of the disclosure.

Accordingly, the storage medium carrying the above program product having machine readable instruction codes stored therein is included in the disclosure. The non-transitory storage medium includes but is not limited to a soft disk, an optical disk, a magneto-optical disk, a storage card, a storage stick and the like.

It is to be understood by those ordinal skilled in the art that, the listed are exemplary embodiments, and the disclosure is not limited thereto.

In the specification, the expressions such as "a first", "a second" and "a n-th" is meant to distinguish the described features literally, so as to describe the disclosure clearly. Thus, these expressions should not be considered as limitation.

As an example, various steps of the above method and various integral modules and/or units of the above apparatus may be implemented as software, firmware, hardware or a combination thereof, and may be used as a part of a corresponding apparatus. The various integral modules and units of the above apparatus, when being configured in a form of software, firmware, hardware or a combination thereof, may be implemented in a means or manner well-known to those skilled in the art, which is not described in detail here.

As an example, in a case of software or firmware, programs composing this software are mounted onto a computer having a dedicated hardware structure (such as the general purpose computer 1000 as shown in FIG. 10) from a non-transitory storage medium or a network. The computer, when being mounted with various programs, is capable of performing various functions and the like.

The feature described and/or illustrated for one embodiment in the above description of the specific embodiment of the disclosure may be applied in one or more other embodiment in a same or similar manner, may be combined with the feature in other embodiment, or may be used to replace the feature in other embodiment.

It is to be emphasized that, term "include/comprise" used herein refers to the presence of a feature, an element, a step or an assembly, but not excludes the presence or addition of other one or more features, elements, steps or assemblies.

Further, the method according to the disclosure is not limited to be performed in the chronological order described in the specification, and may also be performed sequentially, in parallel or separately. Thus, the order described herein in which the method is performed is not meant to limit the technical scope of the disclosure.

The disclosure and the advantages thereof have been descried above. It is to be understood that, various variations, alternations and transformations may be made without deviating from the spirit and scope of the disclosure defined in the appended claims. The scope of the disclosure is not limited to the specific embodiment of the process, device, means, method and step described in the specification. It can be understood by those ordinary skilled in the art from the disclosure that, the process, device, means, method and step that exist or to be developed in the future and perform functions substantially the same and obtain substantially the same result as the corresponding embodiment herein can be used. Thus, the appended claim aims to include such process, device, means, method and step in their scope.

It can be seen from the above illustration that, at least the following technical solutions are disclosed.

Appendix 1

A training method for a neural network for image recognition, comprising: representing a sample image as a point set in a high-dimensional space, a size of the high-dimensional space being a size of space domain of the sample image multiplied by a size of intensity domain of the sample image; generating a first random perturbation matrix having a same size as the high-dimensional space; smoothing the first random perturbation matrix; perturbing the point set in the high-dimensional space using the smoothed first random perturbation matrix to obtain a perturbed point set; and training the neural network using the perturbed point set as a new sample.

Appendix 2

The training method according to Appendix 1, wherein the size of the space domain is a width of the sample image multiplied by a height of the sample image, and the size of the intensity domain is D1×D2× . . . ×Dn, where n is a dimension of the intensity domain, D1, D2, . . . , Dn are sizes of respective dimensions.

Appendix 3

The training method according to Appendix 1, wherein the training the neural network using the perturbed point set as a new sample comprises: projecting the perturbed point set into a two-dimensional or three-dimensional sub-space of the high-dimensional space to obtain a projected image, and training the neural network using the projected image as a new sample.

Appendix 4

The training method according to Appendix 1, wherein the first random perturbation matrix is generated through a given probability distribution, the given probability distribution being a Gaussian distribution or a uniform distribution.

Appendix 5

The training method according to Appendix 1, wherein the first random perturbation matrix is smoothed using a low-pass filter having a same dimension as the first random perturbation matrix, the low-pass filter being one of a Gaussian filter, a mean filter and a middle value filter.

Appendix 6

The training method according to Appendix 1, wherein the perturbing the point set in the high-dimensional space using the smoothed first random perturbation matrix to obtain a perturbed point set comprises:
adding a value of a corresponding element in the smoothed first random perturbation matrix to each point in the point set in the high-dimensional space.

Appendix 7

The training method according to Appendix 1, further comprising: generating a second random perturbation matrix; smoothing the second random perturbation matrix; and perturbing, using the smoothed second random perturbation matrix, feature maps outputted by a convolution layer in training the neural network, wherein a size of the second random perturbation matrix is a length of the feature map multiplied by a width of the feature map multiplied by a number of the feature maps.

Appendix 8

The training method according to Appendix 7, wherein the perturbing, using the smoothed second random perturbation matrix, feature maps outputted by a convolution layer in training the neural network comprises adding a corresponding weighted value of the second random perturbation matrix to a value of the feature map, wherein a weighting coefficient is larger if an absolute value of the feature map is larger.

Appendix 9

A training method for a neural network for image recognition, comprising: transforming a sample image to obtain a transform domain representation of the sample image; representing the transformed sample image as a point set in a high-dimensional space; generating a random perturbation matrix having a same size as the high-dimensional space; smoothing the random perturbation matrix; perturbing the point set in the high-dimensional space using the smoothed random perturbation matrix to obtain a perturbed point set; projecting the perturbed point set into a transform domain sub-space of the high-dimensional space to obtain a transform domain representation of a perturbed sample image; inversely transforming the transform domain representation of the perturbed sample image to obtain a perturbed image; and training the neural network using the perturbed image as a new sample.

Appendix 10

The training method according to Appendix 9, wherein the transform is Discrete Fourier Transform or Discrete Cosine Transform.

Appendix 11

A training apparatus for a neural network for image recognition, comprising: a high-dimensional space representing unit configured to represent a sample image as a point set in a high-dimensional space, a size of the high-dimensional space being a size of space domain of the sample image multiplied by a size of intensity domain of the sample image; a first random perturbation matrix generating unit configured to generate a first random perturbation matrix having a same size as the high-dimensional space; a first smoothing unit configured to smooth the first random perturbation matrix; a first perturbing unit configured to perturb the point set in the high-dimensional space using the smoothed first random perturbation matrix to obtain a perturbed point set; and a training sample determining unit configured to train the neural network using the perturbed point set as a new sample.

Appendix 12

The training apparatus according to Appendix 11, wherein the size of the space domain is a width of the sample image multiplied by a height of the sample image, and the size of the intensity domain is D1×D2× . . . ×Dn, where n is a dimension of the intensity domain, D1, D2, . . . , Dn are sizes of respective dimensions.

Appendix 13

The training apparatus according to Appendix 11, wherein the training sample determining unit is further configured to:

project the perturbed point set into a two-dimensional or three-dimensional sub-space of the high-dimensional space to obtain a projected image, and train the neural network using the projected image as a new sample.

Appendix 14

The training apparatus according to Appendix 11, wherein the first random perturbation matrix is generated through a given probability distribution, the given probability distribution being a Gaussian distribution or a uniform distribution.

Appendix 15

The training apparatus according to Appendix 11, wherein the first smoothing unit is further configured to smooth the first random perturbation matrix using a low-pass filter having a same dimension as the first random perturbation matrix, the low-pass filter being one of a Gaussian filter, a mean filter and a middle value filter.

Appendix 16

The training apparatus according to Appendix 11, wherein the first perturbing unit is further configured to:
add a value of a corresponding element in the smoothed first random perturbation matrix to each point in the point set in the high-dimensional space.

Appendix 17

The training apparatus according to Appendix 11, further comprising: a second random perturbation matrix generating unit configured to generate a second random perturbation matrix; a second smoothing unit configured to smooth the second random perturbation matrix; and a second perturbing unit configured to perturb, using the smoothed second random perturbation matrix, feature maps outputted by a convolution layer in training the neural network, wherein a size of the second random perturbation matrix is a length of the feature map multiplied by a width of the feature map multiplied by a number of the feature maps.

Appendix 18

The training apparatus according to Appendix 17, wherein the second perturbing unit is further configured to:
add a corresponding weighted value of the second random perturbation matrix to a value of the feature map, wherein a weighting coefficient is larger if an absolute value of the feature map is larger.

Although a few embodiments have been shown and described, it would be appreciated by those skilled in the art that changes may be made in these embodiments without departing from the principles and spirit of the invention, the scope of which is defined in the claims and their equivalents.

What is claimed is:
1. A training method for a neural network for image recognition by a computing apparatus, the method comprising:
by the computing apparatus,
representing a sample image as a point set in a high-dimensional space, a space size of the high-dimensional space being a domain size of a space domain of the sample image multiplied by an intensity size of an intensity domain of the sample image;
generating a first random perturbation matrix to perturb a space domain and/or a intensity domain in a same space size as the high-dimensional space;
filtering information of the generated first random perturbation matrix to smooth the generated first random perturbation matrix;
perturbing the point set in the high-dimensional space using the smoothed first random perturbation matrix to obtain a perturbed point set; and
training the neural network using the perturbed point set as a new sample image for the image recognition.

2. The training method according to claim 1, wherein
the domain size of the space domain is a width of the sample image multiplied by a height of the sample image, and
the intensity size of the intensity domain is $D1 \times D2 \times \ldots \times Dn$, where n is a dimension of the intensity domain, $D1, D2, \ldots, Dn$ are sizes of respective dimensions.

3. The training method according to claim 1, wherein the training the neural network using the perturbed point set as a new sample comprises:
projecting the perturbed point set into one of a two-dimensional and three-dimensional sub-space of the high-dimensional space to obtain a projected image, and training the neural network using the projected image as a new sample.

4. The training method according to claim 1, wherein the first random perturbation matrix is generated using a given probability distribution, the given probability distribution being one of a Gaussian distribution and a uniform distribution.

5. The training method according to claim 1, wherein the first random perturbation matrix is smoothed using a low-pass filter having a same dimension as the first random perturbation matrix, the low-pass filter being one of a Gaussian filter, a mean filter and a middle value filter.

6. The training method according to claim 1, wherein the perturbing the point set in the high-dimensional space using the smoothed first random perturbation matrix to obtain a perturbed point set comprises:
adding a value of a corresponding element in the smoothed first random perturbation matrix to each point in the point set in the high-dimensional space.

7. The training method according to claim 1, by the computing apparatus further:
generating a second random perturbation matrix;
smoothing the second random perturbation matrix; and
perturbing, using the smoothed second random perturbation matrix, feature maps output by a convolution layer in training the neural network,
wherein a matrix size of the second random perturbation matrix is a length of a feature map multiplied by a width of the feature map multiplied by a number of the feature maps.

8. The training method according to claim 7, wherein the perturbing, using the smoothed second random perturbation matrix, feature maps outputted by a convolution layer in training the neural network comprises:
adding a corresponding weighted value of the second random perturbation matrix to a value of the feature map, wherein a weighting coefficient is larger if an absolute value of the feature map is larger.

9. A training method for a neural network for image recognition by a computing apparatus, the method comprising:

by the computing apparatus,
transforming a sample image to obtain a transform domain representation of the sample image;
representing a transformed sample image as a point set in a high-dimensional space, a space size of the high-dimensional space being a domain size of a space domain of the sample image multiplied by an intensity size of an intensity domain of the sample image;
generating a random perturbation matrix to perturb a space domain and/or a intensity domain in a same space size as the high-dimensional space;
filtering information of the generated random perturbation matrix to smooth the generated random perturbation matrix;
perturbing the point set in the high-dimensional space using the smoothed random perturbation matrix to obtain a perturbed point set;
projecting the perturbed point set into a transform domain sub-space of the high-dimensional space to obtain a transform domain representation of a perturbed sample image;
inversely transforming the transform domain representation of the perturbed sample image to obtain a perturbed image; and
training the neural network using the perturbed image as a new sample image for the image recognition.

10. The training method according to claim 9, wherein the transform is one of a Discrete Fourier Transform and a Discrete Cosine Transform.

11. A training apparatus for a neural network for image recognition, comprising:
a memory; and
a processor coupled to the memory to,
a sample image as a point set in a high-dimensional space, a space size of the high-dimensional space being a domain size of a space domain of the sample image multiplied by an intensity size of an intensity domain of the sample image;
generate a first random perturbation matrix to perturb a space domain and/or a intensity domain in a same space size as the high-dimensional space;
filtering information of the generated first random perturbation matrix to smooth the generated first random perturbation matrix;
perturb the point set in the high-dimensional space using the smoothed first random perturbation matrix to obtain a perturbed point set; and
train the neural network using the perturbed point set as a new sample image for the image recognition.

12. The training apparatus according to claim 11, wherein the domain size of the space domain is a width of the sample image multiplied by a height of the sample image, and the intensity size of the intensity domain is $D1 \times D2 \times \ldots \times Dn$, where n is a dimension of the intensity domain, $D1, D2, \ldots, Dn$ are sizes of respective dimensions.

13. The training apparatus according to claim 11, wherein the processor is to:
project the perturbed point set into one of a two-dimensional and three-dimensional sub-space of the high-dimensional space to obtain a projected image, and train the neural network using the projected image as the new sample image.

14. The training apparatus according to claim 11, wherein the first random perturbation matrix is generated using a given probability distribution, the given probability distribution being one of a Gaussian distribution and a uniform distribution.

15. The training apparatus according to claim 11, wherein the processor is to filter the first random perturbation matrix using a low-pass filter having a same dimension as the first random perturbation matrix, the low-pass filter being one of a Gaussian filter, a mean filter and a middle value filter.

16. The training apparatus according to claim 11, wherein the processor is to:
add a value of a corresponding element in the smoothed first random perturbation matrix to each point in the point set in the high-dimensional space.

17. The training apparatus according to claim 11, wherein the processor is to:
generate a second random perturbation matrix;
filter information of the generated second random perturbation matrix to smooth the generated second random perturbation matrix; and
perturb, using the smoothed second random perturbation matrix, feature maps output by a convolution layer in training the neural network,
wherein a matrix size of the second random perturbation matrix is a length of a feature map multiplied by a width of the feature map multiplied by a number of the feature maps.

18. The training apparatus according to claim 17, wherein the processor is to:
add a corresponding weighted value of the second random perturbation matrix to a value of the feature map, wherein a weighting coefficient is larger if an absolute value of the feature map is larger.

19. A non-transitory computer readable medium storing a training method for a neural network for image recognition as recited in claim 1.

20. A training apparatus for a neural network for image recognition, comprising:
a computer, comprising:
a high-dimensional space representing unit configured to represent a sample image as a point set in a high-dimensional space, a space size of the high-dimensional space being a domain size of a space domain of the sample image multiplied by an intensity size of an intensity domain of the sample image;
a random perturbation matrix generating unit configured to generate a random perturbation matrix to perturb a space domain and/or a intensity domain in having a same space size as the high-dimensional space;
a smoothing unit configured to filter information of the generated random perturbation matrix to smooth the generated random perturbation matrix;
a perturbing unit configured to perturb the point set in the high-dimensional space using the smoothed random perturbation matrix to obtain a perturbed point set; and
a training sample determining unit configured to train the neural network using the perturbed point set as a new sample image for the image recognition.

* * * * *